United States Patent
Hintersteiner et al.

(10) Patent No.: US 9,641,307 B2
(45) Date of Patent: May 2, 2017

(54) SYSTEM AND METHOD FOR WIRELESS ACCESS POINT LAYOUT AND NETWORK OPERATION

(71) Applicant: Spot On Networks, LLC, New Haven, CT (US)

(72) Inventors: Jason Hintersteiner, Norwalk, CT (US); Richard Sherwin, Guilford, CT (US); Tom Doyle, New Haven, CT (US)

(73) Assignee: Spot On Networks, LLC, New Haven, CT (US)

(*) Notice: Subject to any disclaimer, the term of this patent is extended or adjusted under 35 U.S.C. 154(b) by 0 days.

(21) Appl. No.: 14/020,489

(22) Filed: Sep. 6, 2013

(65) Prior Publication Data
US 2014/0071846 A1   Mar. 13, 2014

Related U.S. Application Data

(60) Provisional application No. 61/698,234, filed on Sep. 7, 2012.

(51) Int. Cl.
| H04L 5/00 | (2006.01) |
| H04W 24/08 | (2009.01) |
| H04W 52/24 | (2009.01) |
| H04W 16/10 | (2009.01) |
| H04W 84/16 | (2009.01) |

(52) U.S. Cl.
CPC ............ *H04L 5/006* (2013.01); *H04W 16/10* (2013.01); *H04W 24/08* (2013.01); *H04W 52/243* (2013.01); *H04W 84/16* (2013.01)

(58) Field of Classification Search
CPC ..... H04L 47/10; H04L 43/50; H04L 12/2697; H04L 43/0852; H04L 43/00
USPC ........................................................ 370/252
See application file for complete search history.

(56) References Cited

U.S. PATENT DOCUMENTS

| 5,642,122 | A  | * | 6/1997 | Lockie et al. ................. 343/881 |
| 7,031,266 | B1 | * | 4/2006 | Patel et al. ..................... 370/254 |
| 7,184,777 | B2 | * | 2/2007 | Diener ................ H04L 41/0896 455/456.1 |
| 7,333,481 | B1 | * | 2/2008 | Rawat ................. H04L 12/4641 370/352 |
| 7,406,051 | B2 | * | 7/2008 | Khun-Jush et al. .......... 370/252 |
| 8,125,917 | B2 | * | 2/2012 | Bevan ................... H04W 24/02 370/252 |
| 8,280,444 | B1 | * | 10/2012 | Shen et al. .................. 455/562.1 |
| 8,305,921 | B2 | * | 11/2012 | Narasimhan et al. ........ 370/252 |
| 8,744,352 | B2 | * | 6/2014 | Pochop, Jr. ........... H04W 16/18 455/41.1 |
| 2003/0012167 | A1 | * | 1/2003 | Benveniste ............. H04L 47/14 370/338 |
| 2004/0165548 | A1 | * | 8/2004 | Backes ......................... 370/328 |
| 2007/0201540 | A1 | * | 8/2007 | Berkman ...................... 375/219 |
| 2008/0089277 | A1 | * | 4/2008 | Alexander et al. ........... 370/328 |

(Continued)

*Primary Examiner* — Mark Rinehart
*Assistant Examiner* — Sanjay K Dewan
(74) *Attorney, Agent, or Firm* — Duane Morris LLP

(57) ABSTRACT

The present disclosure describes systems and methods for creating and/or deploying access points for a wireless network in a multi-unit building or for a private residential neighborhood. Additionally, described herein are methods for operating a wireless network in a multi-unit building that was either deployed according to the concepts described herein or was pre-existing.

23 Claims, 7 Drawing Sheets

(56) References Cited

U.S. PATENT DOCUMENTS

| | | |
|---|---|---|
| 2010/0008230 A1* | 1/2010 | Khandekar et al. .......... 370/237 |
| 2010/0085884 A1* | 4/2010 | Srinivasan et al. ........... 370/252 |
| 2011/0032849 A1* | 2/2011 | Yeung ................. H04B 7/0434 |
| | | 370/280 |
| 2011/0034192 A1* | 2/2011 | Lim et al. ..................... 455/501 |
| 2011/0090885 A1* | 4/2011 | Safavi .......................... 370/338 |
| 2012/0129559 A1* | 5/2012 | Pochop, Jr. .................. 455/507 |
| 2012/0177095 A1* | 7/2012 | Haran ................. H03G 3/3078 |
| | | 375/224 |
| 2015/0016561 A1* | 1/2015 | Negus et al. ................. 375/267 |
| 2015/0029906 A1* | 1/2015 | Jana et al. .................... 370/278 |

* cited by examiner

SYSTEM AND METHOD FOR WIRELESS ACCESS POINT LAYOUT AND NETWORK OPERATION

RELATED AND CO-PENDING APPLICATIONS

This application claims priority to co-pending U.S. provisional application entitled "System and Method for Wireless Access Point Layout and Network Operation", Ser. No. 61/698,234 filed 7 Sep. 2012, the entirety of which is hereby incorporated herein by reference.

BACKGROUND

Current systems and methods for deploying and/or operating a wireless WiFi communication network (hereinafter referred to as a "wireless communication network" or a "wireless network") in a private residential neighborhood or a multi-unit building generally rely on placing a wireless router (e.g., access point) in each individual unit. As used herein, multi-unit buildings may be single floor or multi-floor buildings, and include buildings containing apartments, offices, condominiums, dormitories, etc., as well as referring to buildings such as hotels, motels, inns, shopping malls, and similar structures. One of the problems with the approach used by current methods is that wireless routers are typically designed to provide coverage of an area that is much larger than an individual unit. Consequently, there is significant bleed over of signals into neighboring units, both on the same floor and on neighboring floors. Such an arrangement compromises the privacy and security of the user of a unit's router and may also lead to interference between the wireless routers used in different units.

Furthermore, if a unit's user (i.e., the owner, renter, resident, office worker, guest, etc.) has a wireless device in his unit (e.g., a wirelessly-controlled thermostat, refrigerator, light, or other similar appliance or device) which he controls from his mobile apparatus (e.g., cell phone, laptop, wireless electronic tablet, etc.) his control of that wireless device may be partially or totally impaired once the user exits the coverage area (e.g., "cell") of his unit's particular access point ("AP").

Accordingly, there is a need for a solution to the problems described above associated with current methods for deploying and/or operating a wireless network in a multi-unit building.

DETAILED DESCRIPTION

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific devices and/or methodologies, it is to be understood that the discussion is not intended to limit the scope of the present subject matter in any way and that the principles presented are equally applicable to other devices and/or methodologies.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

With reference to the figures where like elements have been given like numerical designations to facilitate an understanding of the present subject matter, various embodiments of a system and method for wireless access point layout and network operation are described.

Figure 1:
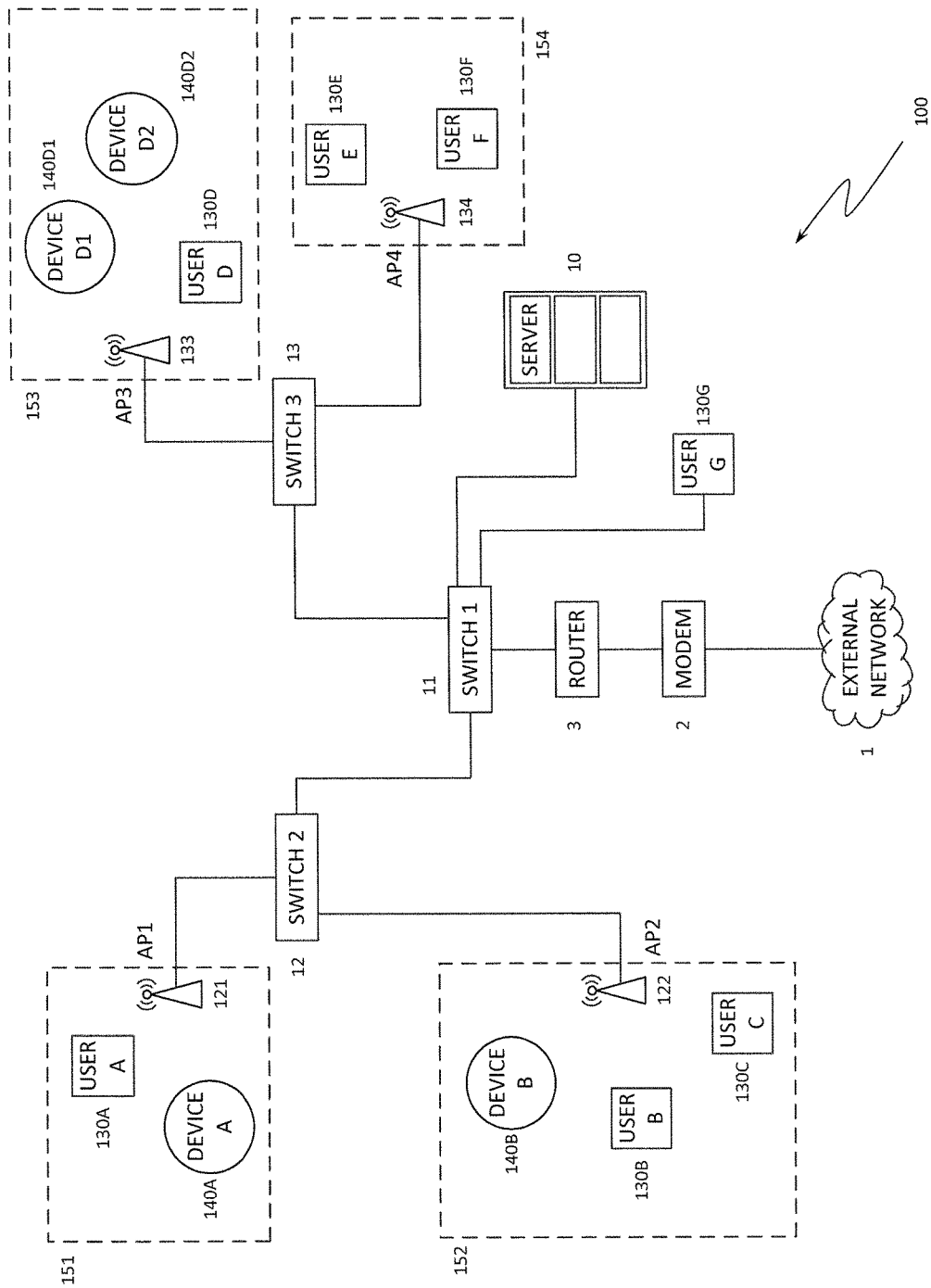
FIG. 1 is a block diagram for a topology of an exemplary prior art network.

The present disclosure describes novel systems and methods for deploying and operating a wireless network in a multi-unit building. With attention drawn to FIG. 1, a block diagram for the topology of an exemplary prior art network 100 is depicted. The network 100 connects to external network 1 (such as a wide area network, an enterprise network, the Internet, or other similar network) via modem 2 and router 3, as is known in the art. The exemplary network 100 includes switches switch 1 (11), switch 2 (12), and switch 3 (13), connected as shown. Connected to switch 2 are AP1 (121) and AP2 (122). Connected to switch 3 are AP3 (133) and AP4 (134). Server 10 for network 100 is connected to switch 1 as shown. Those of skill in the art will readily understand that the topology depicted in FIG. 1 is exemplary only and in no way limits the scope of the disclosure.

AP1 services unit 151 in which user A has a mobile apparatus 130A and wireless device A (140A), such as a wirelessly-controlled appliance. AP1 also services one or more units adjacent to unit 151 (not shown for clarity). AP2 services unit 152 in which user B has a mobile apparatus 130B and wireless device B (140B). Additionally, unit 152 includes user C who has a mobile apparatus 130C. AP2 also services one or more units adjacent to unit 152 (not shown for clarity). Similarly, AP3 services unit 153 in which user D has a mobile apparatus 130D and wireless device D1 (140D1) and wireless device D2 (140D2). AP3 also services one or more units adjacent to unit 153 (not shown for clarity). Likewise, AP4 services unit 154 in which user E has a mobile apparatus 130E. Additionally, unit 154 includes user F who has a mobile apparatus 130F. AP4 also services one or more units adjacent to unit 154 (not shown for clarity).

User G, in the depicted topology of exemplary network 100, is hard-wired into switch 1 (11) although user G may also be connected via a wireless link. User G represents typical network administration users such as one or more of a network administrator, supervisor, building maintenance, etc.

In conventional private residential neighborhoods or multi-dwelling units, each unit typically has a dedicated AP which may interfere with and/or bleed over to a neighboring unit thereby inviting privacy and security problems. To combat this, the conventional approach is to employ an encryption key for each AP. While this may be an effective answer to the security problem, it does nothing to overcome the privacy problem since users in neighboring units will still be able to see all other connected users on that network.

Figure 2:
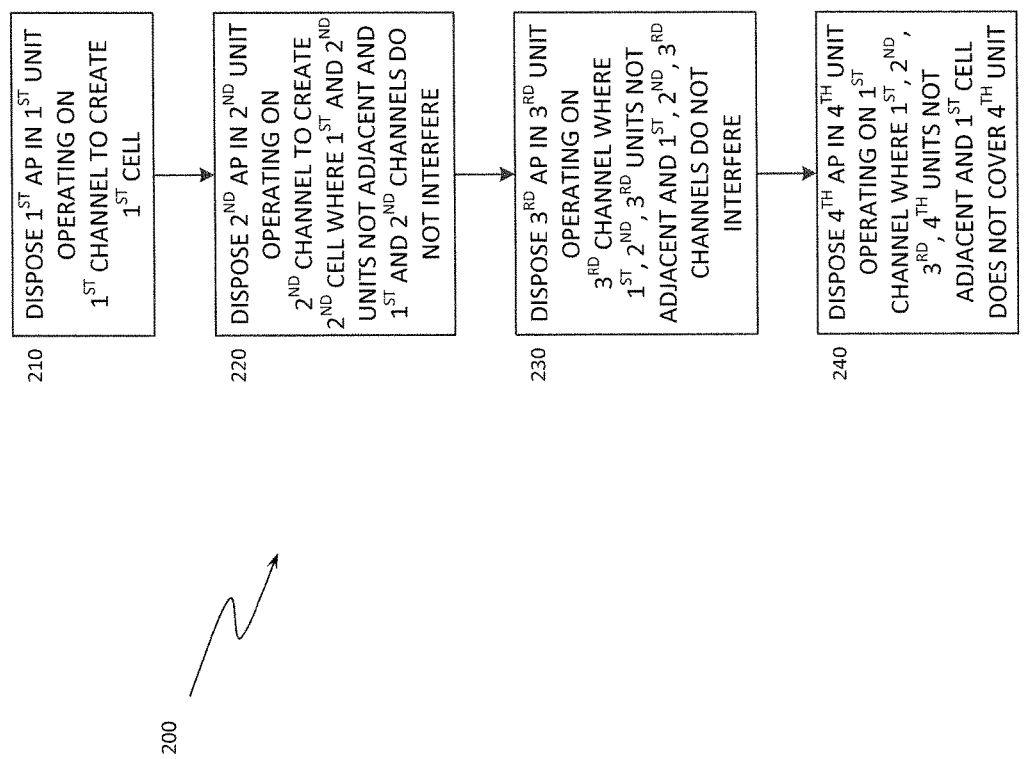
FIG. 2 is a flow chart for creating a wireless network according to an embodiment of the present subject matter.

Now turning to FIG. 2, a flow chart 200 is shown for creating and/or deploying a wireless network according to an embodiment of the present subject matter that will address both the security and privacy issues of the prior art. At block 210, a first access point operating on a first channel of a predetermined set of channels is disposed in a first unit to create a first wireless cell. The first wireless cell provides wireless coverage to the first unit and to a unit adjacent to the first unit. At block 220, a second access point operating on a second channel of the predetermined set of channels is disposed in a second unit, which is not adjacent (either horizontally or vertically) to the first unit, to create a second wireless cell. The second wireless cell provides wireless coverage to the second unit and to a unit adjacent to the second unit. The second channel is chosen so as to not interfere with the first channel.

At block 230, a third access point operating on a third channel of the predetermined set of channels is disposed in a third unit, which is not adjacent (either horizontally or vertically) to either of the first or the second unit, to create a third wireless cell. The third wireless cell provides wireless coverage to the third unit and to a unit adjacent to the third unit. The third channel is chosen so as to not interfere with the first or the second channel. At block 240, a fourth access point operating on the first channel of the predetermined set of channels is disposed in a fourth unit, which is not adjacent (either horizontally or vertically) to either of the first, second, or third unit, to create a fourth wireless cell. The fourth wireless cell provides wireless coverage to the fourth unit and to a unit adjacent to the fourth unit. Furthermore, the first wireless cell does not provide wireless coverage to either of the fourth unit or to the unit adjacent to the fourth unit which is served by the third access point.

In this manner, fewer APs need to be deployed to cover all of the units in the multi-unit building. In an embodiment, the APs are placed in a tessellated grid to cover multiple units in the multi-unit building. In a further embodiment, for a multi-floor multi-unit building, the APs are placed in a 3D tessellated grid. The above process may be repeated as necessary to ensure each unit, as desired, in the multi-unit building is serviced by adequate wireless coverage.

Further enhancements to the above deployment embodiment are also contemplated. In an embodiment, the first AP may operate at a first selected power level while the second AP operates at a second power level that is determined based on an interference measurement in the second unit due to the wireless signal from the first wireless cell. In a further embodiment, the third AP operates at a third power level that is determined based on an interference measurement in the third unit due to the wireless signals from the first and second wireless cells.

In yet another embodiment, which may be a further enhancement to any of the above-described deployment strategies, the first, second, and third APs may each have the capability to transmit a wireless signal according to a configurable antenna beam pattern. In this embodiment, the first AP may operate using a first selected antenna beam pattern while the second AP operates using a second antenna beam pattern that is determined based on an interference measurement in said second unit due to the wireless signal from the first wireless cell. In still another embodiment, the third AP operates using a third antenna beam pattern that is determined based on an interference measurement in the third unit due to the wireless signals from the first and second wireless cells.

In other embodiments, the first and second units are on a same level of a multi-unit building and/or at least one of the first, second, third, and fourth units are on a first floor of a multi-unit building and the other(s) of the first, second, third, and fourth units are on a second floor of the multi-unit building.

In still other embodiments, the first and second wireless cells provide wireless coverage to the second unit and/or the first, second, and third wireless cells provide coverage to the first unit.

Figure 3:
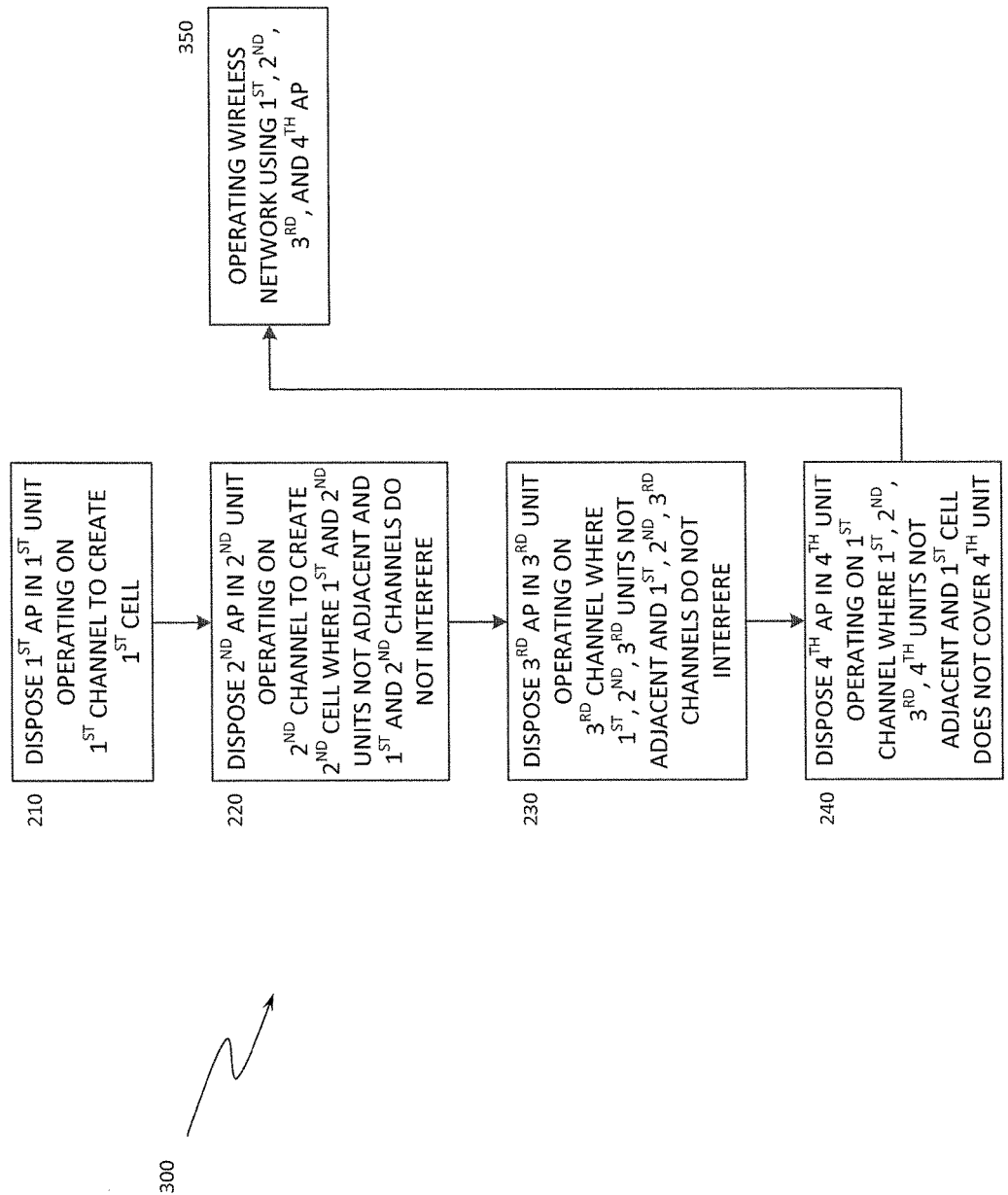
FIG. 3 is a flow chart for creating and operating a wireless network according to another embodiment of the present subject matter.

FIG. 3 illustrates a flow chart 300 for creating and operating a wireless network according to another embodiment of the present subject matter. In FIG. 3, blocks 210, 220, 230, and 240 are as described above with respect to FIG. 2 for creating and/or deploying a wireless network including the first, second, third, and fourth APs. At block 350, the wireless network that was created and/or deployed is operated using the first, second, third, and fourth APs.

Figure 4:
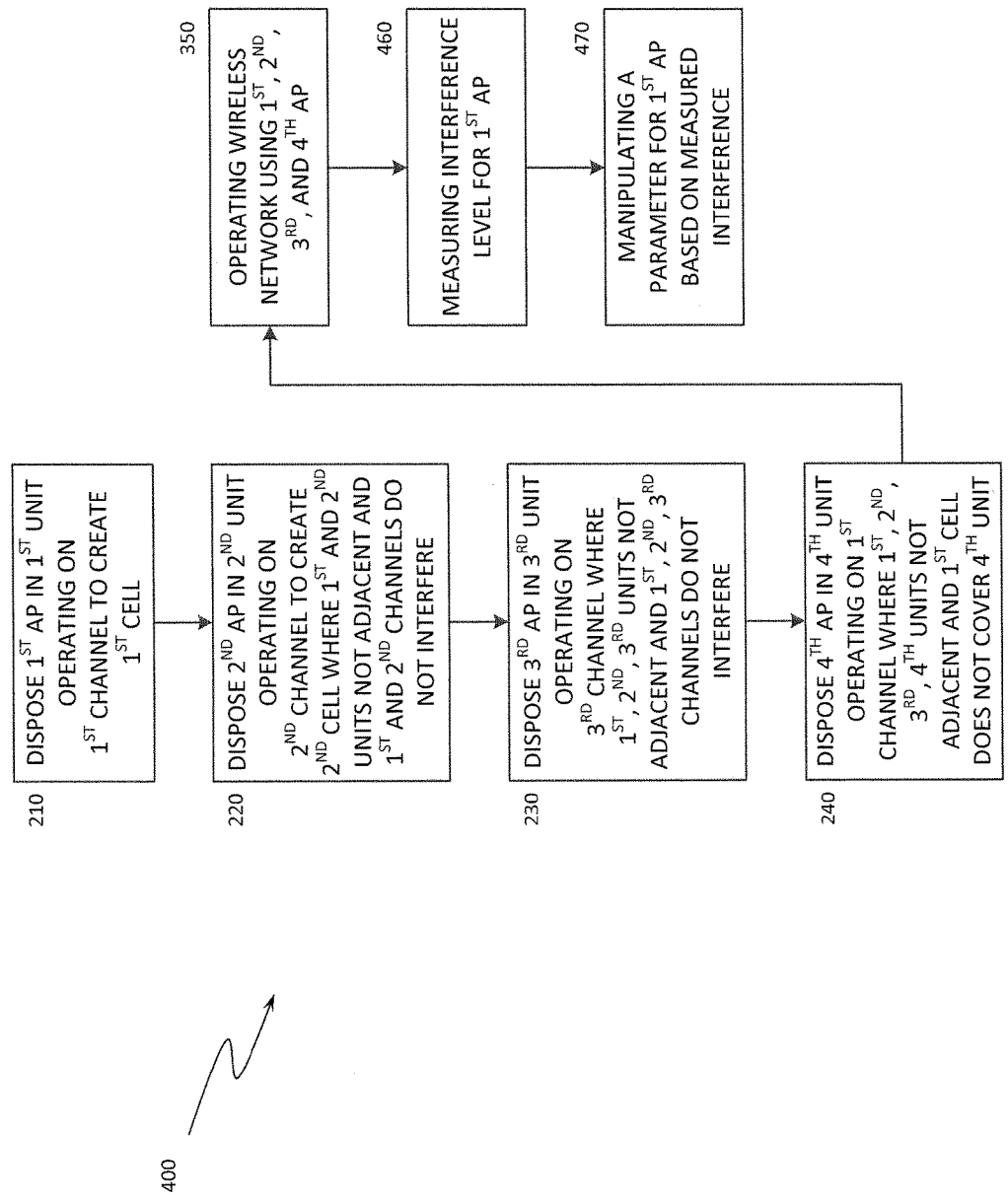
FIG. 4 is a flow chart for creating and operating a wireless network according to yet another embodiment of the present subject matter.

Considering FIG. 4, a flow chart 400 is shown for creating and operating a wireless network according to yet another embodiment of the present subject matter. In FIG. 4, blocks 210, 220, 230, 240, and 350 are as described above with respect to FIG. 3 for creating and operating a wireless network including the first, second, third, and fourth APs. At block 460, an interference level for the first AP is measured. At block 470, at least one parameter of the first AP is manipulated based on the measured interference level for the first AP. The parameters that may be manipulated include antenna beam pattern, communication channel selection, and output power level. Therefore, the wireless network will be able to operate without undue interference amongst the various APs while maintaining the privacy desired by the network users.

Figure 5:
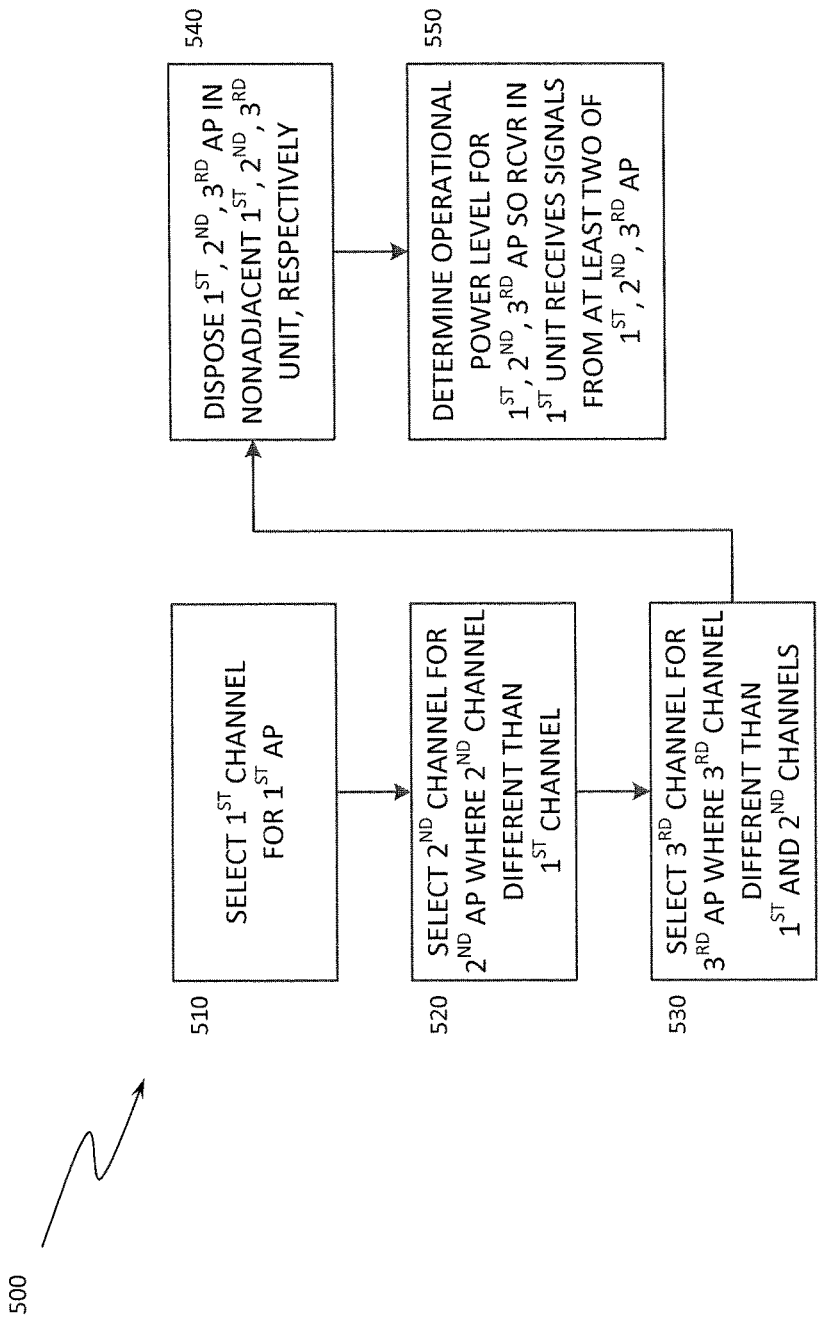
FIG. 5 is a flow chart for deploying a wireless network according to an embodiment of the present subject matter.

Now considering FIG. 5, a flow chart 500 is presented for deploying a wireless network according to an embodiment of the present subject matter. At block 510, a first communication channel is selected for a first AP where the first communication channel is selected from a predetermined set of communication channels. At block 520, a second communication channel is selected for a second AP where the second communication channel is selected from the same predetermined set of communication channels. Additionally, the second communication channel selected is different from the first communication channel selected. At block 530, a third communication channel is selected for a third AP where the third communication channel is selected from the same predetermined set of communication channels. Additionally, the third communication channel selected is different from the first and second communication channels selected.

At block 540, the first, second, and third APs are deployed in a first, second, and third unit, respectively, in a multi-unit building where each of the first, second, and third units is not adjacent to either of the other two units. At block 550, for each of the first, second, and third APs, a respective operational power level is determined such that a receiver disposed in the first unit can receive communication signals from at least two of the first, second, and third APs. Thus, a user in the first unit can receive wireless communication signals from multiple, non-interfering APs. In a further embodiment, an antenna beam pattern for at least one of the first, second, and third APs may be manipulated as necessary to ensure adequate wireless coverage while maintaining user privacy.

In other embodiments, the wireless network of FIG. 5 is deployed in a multi-story, multi-unit building. In a further embodiment, each of the first, second, and third units is not adjacent to either of the other two units, either horizontally or vertically. In still a further embodiment, the step of disposing the first, second, and third APs in FIG. 5 occurs after the selection of the first, second, and third communication channels. In yet a further embodiment, the first access point is disposed in a hallway adjacent to the first unit.

Figure 6:
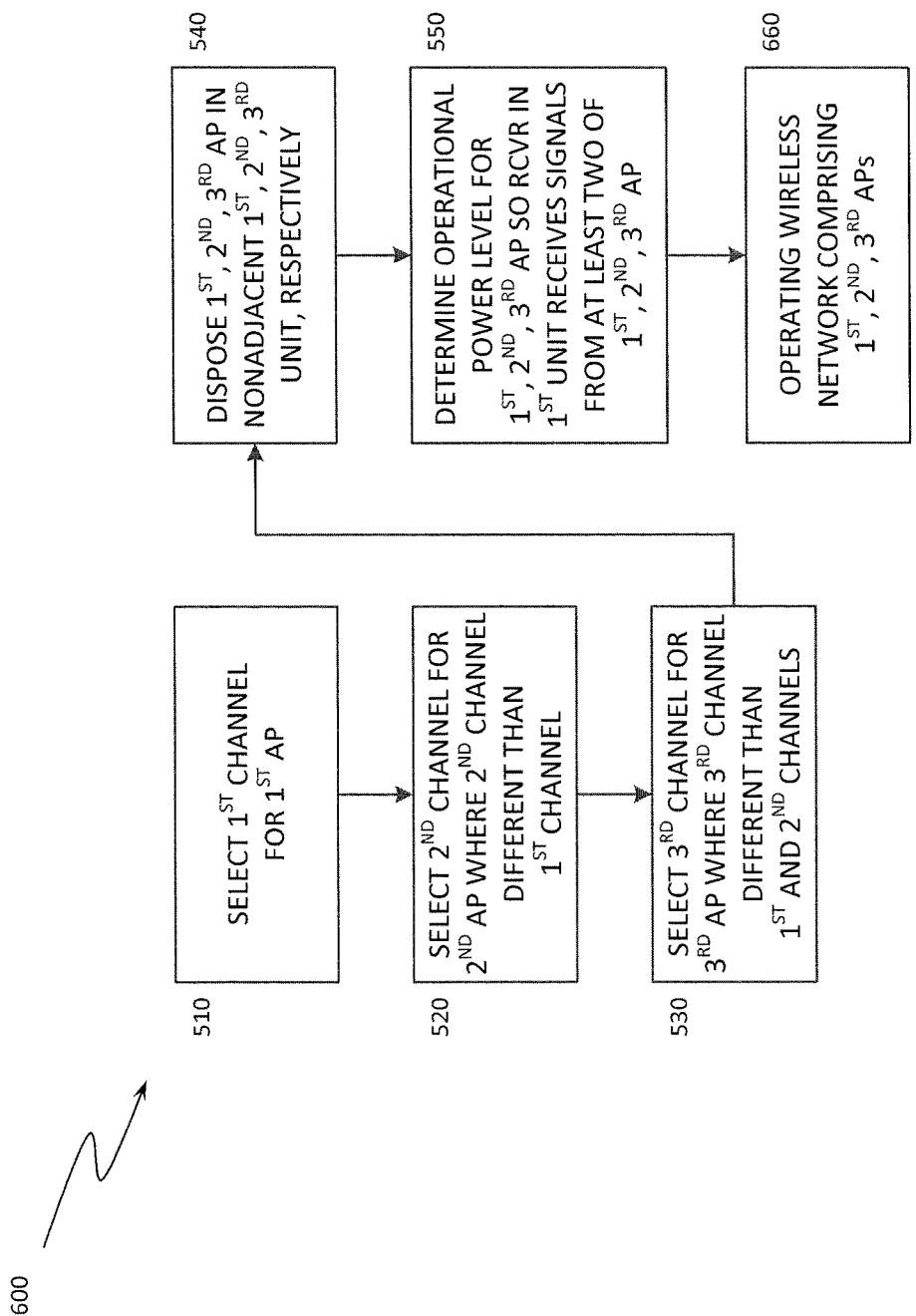
FIG. 6 is a flow chart for deploying and operating a wireless network according to another embodiment of the present subject matter.

FIG. 6 shows a flow chart 600 for deploying and operating a wireless network according to another embodiment of the present subject matter. In FIG. 6, Blocks 510, 520, 530, 540, and 550 are as described above with respect to FIG. 5. At block 660, the wireless network that was deployed is operated using the first, second, and third APs.

Figure 7:
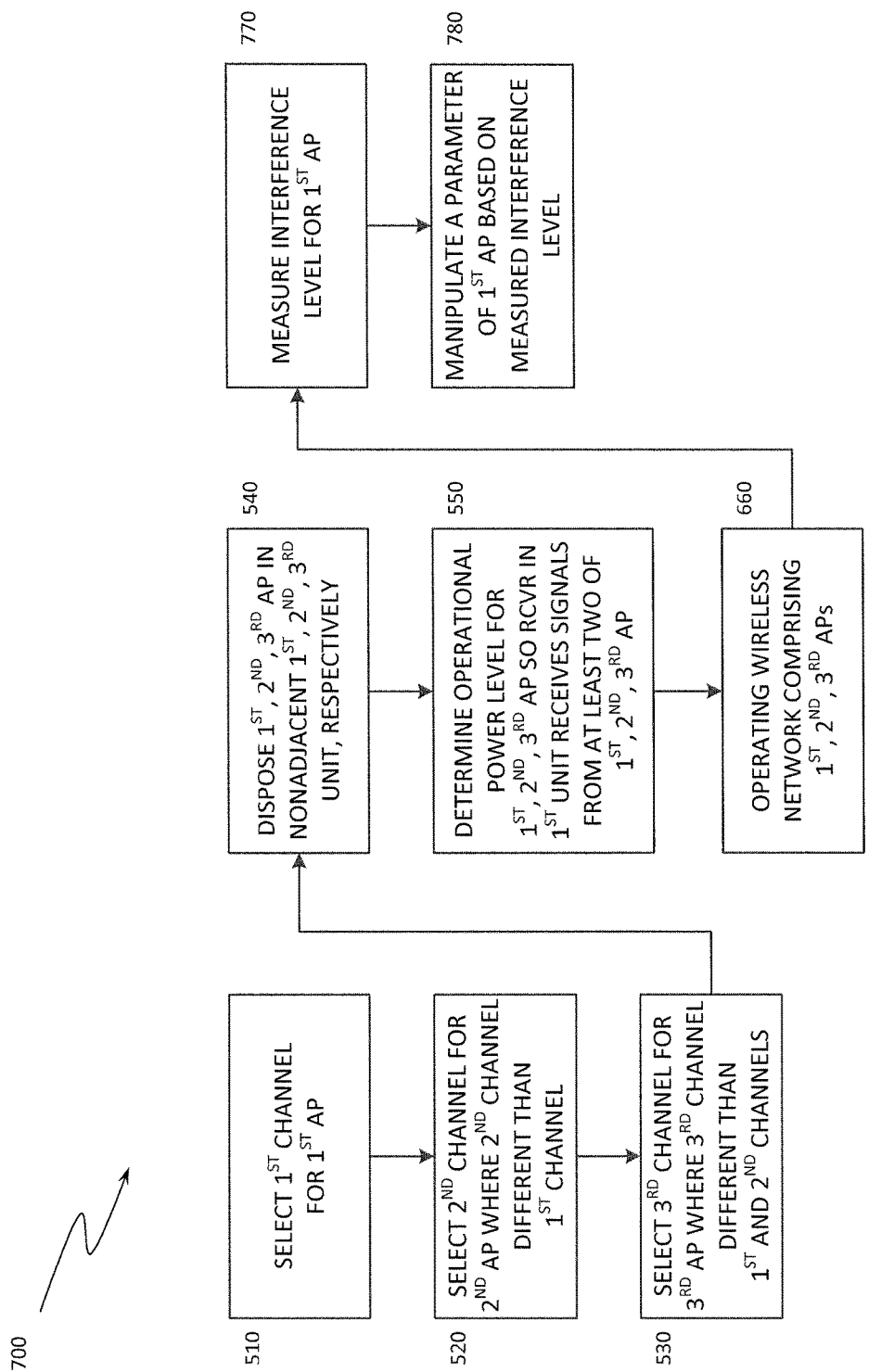
FIG. 7 is a flow chart for deploying a wireless network according to yet another embodiment of the present subject matter.

FIG. 7 depicts a flow chart 700 for deploying a wireless network according to yet another embodiment of the present subject matter. In FIG. 7, Blocks 510, 520, 530, 540, 550, and 660 are as described above with respect to FIG. 6. At block 770, an interference level for the first AP is measured. At block 780, based on the measured interference level for the first AP, at least one parameter of the first AP is manipulated where the parameter is one or more of antenna beam pattern, communication channel selection, and output power level.

In a further embodiment regarding FIG. 7, the steps of selecting the first, second, and third communication channels are accomplished prior to operating the wireless communication network.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A method, for creating a wireless WiFi network in a multi-unit building in a manner to provide redundant coverage and to minimize interference between access points, the method comprising the steps of:
   (a) disposing in a first unit a first access point operating on a first channel of a predetermined set of channels to thereby create a first wireless cell, wherein the first wireless cell provides wireless coverage to the first unit and to a unit adjacent to the first unit, wherein said first access point operates at a first power level;
   (b) disposing in a second unit a second access point operating on a second channel of the predetermined set of channels to thereby create a second wireless cell, wherein the second wireless cell provides wireless coverage to the second unit and to a unit adjacent to the second unit, and wherein the second channel does not interfere with the first channel, and wherein the second unit is not adjacent to said first unit, and wherein said second access point operates at a second power level wherein the second power level is determined based on an interference measurement in said second unit due to said first access point;
   (c) disposing in a third unit a third access point operating on a third channel of the predetermined set of channels to thereby create a third wireless cell, wherein the third wireless cell provides wireless coverage to the third unit and to a unit adjacent to the third unit, and wherein the third channel does not interfere with the first or second channel, and wherein the third unit is not adjacent to either of said first or second unit, and wherein said third access point operates at a third power level wherein the third power level is determined based on an interference measurement in said third unit due to at least one of said first and second access points; and
   (d) disposing in a fourth unit a fourth access point operating on the first channel of the predetermined set of channels to thereby create a fourth wireless cell, wherein the fourth wireless cell provides wireless coverage to the fourth unit and to a unit adjacent to the fourth unit, and wherein the fourth unit is not adjacent to either of said first, second, or third unit, and wherein the first wireless cell does not provide wireless coverage to either said fourth unit or to said unit adjacent to the fourth unit, and wherein said fourth access point operates at a fourth power level wherein the fourth power level is determined based on an interference measurement in said fourth unit due to at least one of said first, second, and third access points, wherein at least one of the first, second, third and fourth access points is on a different floor from the other access points, and wherein each of the first, second, third and fourth channels is a unique channel, and wherein wireless coverage is supplied to said first unit from said first wireless cell and from one of said second, third, or fourth wireless cells, and wherein wireless coverage is supplied to said second unit from said second wireless cell and from one of said first, third, or fourth wireless cells, and wherein one of said wireless cells supplying wireless coverage to said first unit is not supplying wireless coverage to said second unit.

2. The method of claim 1 wherein said first access point uses a first predetermined antenna pattern.

3. The method of claim 2 wherein said second access point uses a second antenna pattern wherein the second antenna pattern is determined based on an interference measurement in said second unit due to said first access point.

4. The method of claim 3 wherein said third access point uses a third antenna pattern wherein the third antenna pattern is determined based on an interference measurement in said third unit due to said first and second access points.

5. The method of claim 1 wherein said first and second units are on a same level of the multi-unit building.

6. The method of claim 1 further comprising the step of:
(e) operating the wireless communication network comprising said first, second, third, and fourth access points.

7. The method of claim 6 further comprising the steps of:
(f) measuring an interference level for said first access point; and
(g) manipulating, based on the measured interference level for said first access point, at least one parameter of said first access point wherein said parameter is selected from the list consisting of: an antenna beam pattern, a communication channel selection, and an output power level.

8. The method of claim 1 wherein said first access point is disposed in a hallway adjacent to said first unit.

9. A method for creating a wireless WiFi network to provide redundant coverage, comprising the steps of:
(a) selecting for a first access point a first communication channel from a predetermined set of communication channels;
(b) selecting for a second access point a second communication channel from the predetermined set of communication channels, wherein said second communication channel is different from said first communication channel;
(c) selecting for a third access point a third communication channel from the predetermined set of communication channels, wherein said third communication channel is different from said first and said second communication channels;
(d) disposing said first, second, and third access points in a first, second, and third unit, respectively, in a multi-unit building wherein each of said first, second, and third units is not adjacent to either of the other two said units, wherein at least one of the first, second and third access points is on a different floor from the other access points, and; and
(e) determining for each of said first, second, and third access points a respective operational power level such that a first receiver disposed in said first unit can receive communication signals from at least two of said first, second, and third access points, and a second receiver disposed in said second unit can receive communication signals from at least two of said first, second, and third access points, wherein each of the first, second and third communication channels is a unique channel, and wherein one of said access points supplying communication signals to said first receiver is not supplying communication signals to said second receiver.

10. The method of claim 9 wherein step (e) further comprises manipulating an antenna beam pattern for at least one of said first, second, and third access points.

11. The method of claim 9 further comprising the step of:
(f) operating a wireless communication network comprising said first, second, and third access points.

12. The method of claim 11 further comprising the steps of:
(g) measuring an interference level for said first access point; and
(h) manipulating, based on the measured interference level for said first access point, at least one parameter of said first access point wherein said parameter is selected from the list consisting of: an antenna beam pattern, a communication channel selection, and an output power level.

13. The method of claim 11 wherein the steps of selecting said first, second, and third communication channels are accomplished prior to operating said wireless communication network.

14. The method of claim 9 wherein said multi-unit building is multi-story.

15. The method of claim 14 wherein each of said first, second, and third units is not adjacent to either of the other two said units, either horizontally or vertically.

16. The method of claim 9 wherein the step of disposing said first, second, and third access points occurs after said selection of said first, second, and third communication channels.

17. The method of claim 9 wherein said first access point is disposed in a hallway adjacent to said first unit.

18. In a method for operating a wireless WiFi network to provide redundant coverage in a multi-unit building where the wireless network includes plural access points, and where each of the plural access points is initially configured to operate on a preselected communication channel from a predetermined set of communication channels, where at least two of the plural access points are initially configured to operate on different communication channels, and where each of the plural access points has an adjustable antenna beam pattern and an adjustable output power level, the improvement comprising optimizing the performance of the wireless network by manipulating a deployment pattern of the plural access points in the multi-unit building and at least two of the three parameters of:
(a) a selection of a communication channel from the predetermined set of communication channels for each of the plural access points individually,
(b) a selection of an output power level for each of the plural access points individually, and
(c) a selection of an antenna beam pattern for each of the plural access points individually, wherein wireless coverage is supplied to a first unit of said multi-unit building from a first access point of said plural access points and from one of a second, third, or fourth access points of said plural access points, and wherein at least one of the first second third and fourth access points is on a different floor from the other access points, and wherein wireless coverage is supplied to a second unit of said multi-unit building from a second access point of said plural access points and from one of said first, a third, or a fourth access points of said plural access points, and wherein one of said access points supplying wireless coverage to said first unit is not supplying wireless coverage to said second unit.

19. The method of claim 18 wherein the deployment pattern of the plural access points in the multi-unit building forms a tessellated grid.

20. The method of claim 18 further comprising the steps of:

measuring an interference level for one of said plural access points; and manipulating, based on the measured interference level for said first access point, at least one parameter of said first access point wherein said parameter is selected from the list consisting of: an antenna beam pattern, a communication channel selection, and an output power level.

21. The method of claim 18 wherein said multi-unit building is multi-story and wherein the deployment pattern of the plural access points in the multi-unit building forms a 3D tessellated grid.

22. The method of claim 18 wherein one of said plural access points is disposed in a unit of the multi-unit building.

23. The method of claim 18 wherein one of said plural access points is disposed in a hallway of the multi-unit building.

* * * * *